(12) United States Patent
Butler et al.

(10) Patent No.: US 11,466,724 B2
(45) Date of Patent: Oct. 11, 2022

(54) TORSION BAR ASSEMBLY AND METHOD OF ASSEMBLING SAME

(71) Applicant: TRW Limited, Solihull (GB)

(72) Inventors: Stephen Butler, Wolverhampton (GB); Jose Martins, Comblanchien (FR); James Stephen Ironside, Birmingham (GB)

(73) Assignee: ZF Automotive UK Limited

( * ) Notice: Subject to any disclaimer, the term of this patent is extended or adjusted under 35 U.S.C. 154(b) by 373 days.

(21) Appl. No.: 16/382,779

(22) Filed: Apr. 12, 2019

(65) Prior Publication Data
US 2019/0316627 A1 Oct. 17, 2019

(30) Foreign Application Priority Data
Apr. 13, 2018 (GB) .................................... 1806096

(51) Int. Cl.
*F16C 1/08* (2006.01)
*F16D 1/10* (2006.01)
*F16D 3/10* (2006.01)

(52) U.S. Cl.
CPC ............... *F16C 1/08* (2013.01); *F16D 1/101* (2013.01); *F16D 3/10* (2013.01); *F16D 2001/102* (2013.01); *Y10T 403/1616* (2015.01)

(58) Field of Classification Search
CPC ... F16C 1/08; F16D 3/10; F16D 1/101; F16D 2001/102; Y10T 403/1616
(Continued)

(56) References Cited

U.S. PATENT DOCUMENTS 2,822,677 A * 2/1958 Reynolds .................. F16F 1/16
464/97
5,072,650 A * 12/1991 Phillips .................. B62D 5/083
464/97
(Continued)

FOREIGN PATENT DOCUMENTS

KR 1020100133127 A 12/2010

OTHER PUBLICATIONS

GB Patents Act 1977: Search Report under Section 17(5), Application No. GB1806096.2, dated Oct. 8, 2018.

*Primary Examiner* — Greg Binda
(74) *Attorney, Agent, or Firm* — Robert James Harwood

(57) ABSTRACT

A torsion bar assembly comprises an input shaft, an output shaft, and a torsion bar that connects the input shaft to the output shaft. An end stop face on the input shaft that co-operates with a respective end stop face of the output shaft to limit an angular deflection of the torsion bar assembly in a first direction away from the neutral position and an end stop face on the input shaft that co-operates with a respective end stop face of the output shaft to limit an angular deflection of the torsion bar assembly in a second direction that opposes the first direction. A first alignment feature is provided at or close to the end of the input shaft nearest the output shaft and a second alignment feature is provided at or close to an end of the output shaft nearest to the input shaft, the first alignment feature facing the second alignment feature across a gap. The alignment features each define respective contact surfaces such that if the input shaft and the output shaft are pressed axially towards each other to close up the gap the contact faces co-operate to set relative angular positions of the input shaft and the output shaft to correspond to a neutral position.

15 Claims, 8 Drawing Sheets

(58) Field of Classification Search
USPC .......................................... 464/97; 180/412
See application file for complete search history.

(56) References Cited

U.S. PATENT DOCUMENTS

| | | | | |
|---|---|---|---|---|
| 5,562,016 | A | * | 10/1996 | Schoffel ................ B62D 5/083 180/417 |
| 5,582,265 | A | * | 12/1996 | Martin ................... B62D 5/083 |
| 5,697,847 | A | * | 12/1997 | Meyer ...................... F16D 3/80 464/97 |
| 2014/0345392 | A1 | | 11/2014 | Matsui et al. |

\* cited by examiner

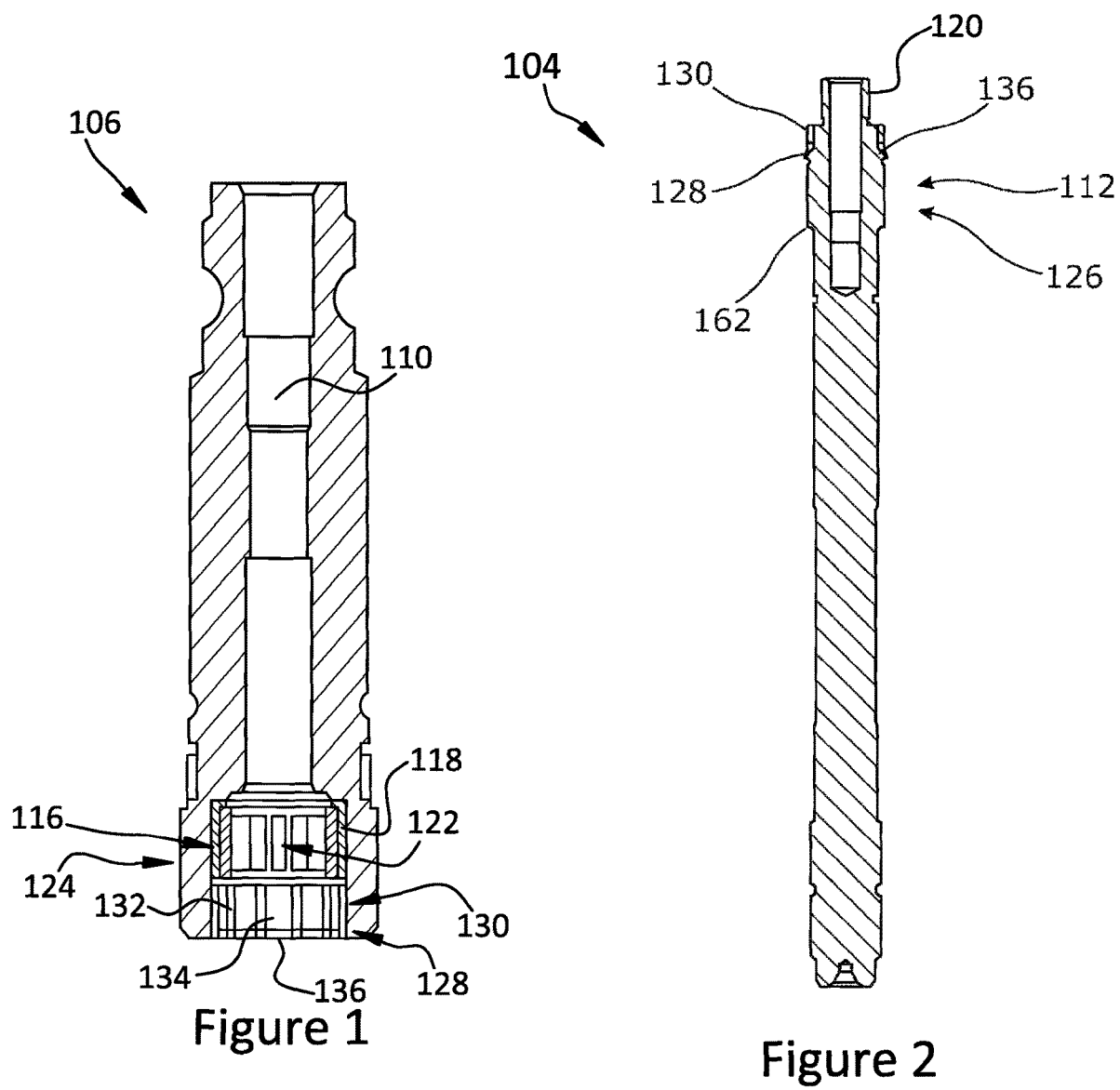

TORSION BAR ASSEMBLY AND METHOD OF ASSEMBLING SAME

CROSS-REFERENCE TO RELATED APPLICATIONS

This application claims priority to Great Britain Patent Application No. 1806096.2, filed 13 Apr. 2018, the disclosures of which are incorporated herein by reference in entirety.

BACKGROUND TO THE INVENTION

This invention relates to torsion bar assemblies for use in an electric power assisted steering apparatus or in any other apparatus in which it is desirable to measure the torque carried by a shaft.

In an electric power assisted steering apparatus, an electric motor is provided which is connected to a steering shaft or steering rack so that an assistance torque can be applied to help the driver to turn the steering wheel. In order to determine how much assistance torque is required, it is important to be able to determine the torque that the driver is applying to the steering shaft as they turn the steering wheel. Typically, the required assistance torque will be of the same sense as the torque applied by the driver and will be related to the driver-applied torque by a function defined by a torque map. This is well known to the person skilled in the art.

The torque applied by the driver can be measured by observing the amount of twist of a shaft through which the torque is transferred. Provided that the torsional rigidity of the shaft is known, then the torque will be a function of the angular twist of a known length of the shaft.

To make it easier to measure the torque it is desirable for the shaft to deflect significantly for the expected torque range that can be applied by a driver. To do this the shaft should be torsionally relatively flexible. However, this then creates a risk of the shaft breaking or elastically deforming if too much torque is applied, as may happen if a road wheel of the vehicle strikes a hole or obstacle when travelling at speed.

It is therefore known to provide a torsion bar assembly into the load path of the steering apparatus that enables a wide angular deflection to be achieved at low torques but also provides a safety feature to prevent damage at high torques. A typical torsion bar assembly comprises an input shaft and an output shaft that are arranged in series along a common axis of rotation. The input shaft and output shaft are joined together by a relatively flexible shaft known as a torsion bar. This may also be referred to as a quill shaft. When a torsional load is applied to the input shaft it is transferred to the output shaft by the torsion bar. The torsion bar is relatively flexible when subject to a torsional load, which causes an angular offset between to the input shaft and the output shaft to be generated that is a function of the torque applied. The skilled person will appreciate that this angle can be measured using a suitable sensor or set of sensors and from this the torque carried by the shaft can be determined. The input shaft and output shaft are provided with end stops. These end stops limit the angular movement of the input shaft relative to the output shaft and may comprise dog teeth.

SUMMARY OF THE INVENTION

It is important during manufacture of a torsion bar assembly that the neutral position of the input shaft and output shaft, where there is not torque carried by the torsion bar, lies at the midpoint between the end stops so that the torsion bar can deform to the full extent from torques of both senses. A feature of the present invention is to provide a torsion bar assembly that simplifies the assembly.

According to a first aspect, the invention provides a torsion bar assembly comprising an input shaft, an output shaft, and a torsion bar that connects the input shaft to the output shaft and fixes the relative angular position of the input shaft and output shaft at a neutral position when no torque is carried by the torsion bar. At least one end stop face on the input shaft co-operates with a respective end stop face of the output shaft to limit an angular deflection of the torsion bar assembly in a first direction away from the neutral position. At least one end stop face on the input shaft co-operates with a respective end stop face of the output shaft to limit an angular deflection of the torsion bar assembly in a second direction that opposes the first direction. A first alignment feature is provided at or close to the end of the input shaft nearest the output shaft. A second alignment feature is provided at or close to an end of the output shaft nearest to the input shaft. The first alignment feature faces the second alignment feature across a gap so that they do not contact each other over a range of angular movement of the torsion bar. The alignment features each define respective contact surfaces that are located such that if the input shaft and the output shaft are pressed axially towards each other to close up the gap, the contact faces co-operate to set relative angular positions of the input shaft and the output shaft to correspond to the neutral position and to further prevent relative angular movement between the input shaft and the output shaft.

The torsion bar may engage the input shaft and the output shaft by an interference fit of axially aligned splines on the torsion bar with the inside diameter of the input shaft and output shaft.

The applicant has appreciated that the provision of the alignment features may simplify assembly by providing an assured correct relative angular alignment of the input shaft and the output shaft to define the neutral position prior to final fixing of the torsion bar. There is no longer a need to secure the angular position of the input and output shafts during the torsion bar assembly which enables it to be very simply pressed into position. The use of splines on the torsion bar where the bar engages the input shaft and output shaft also assists this as the splines ensure that the pressing of the torsion bar into position does not itself create any rotational forces on the two shafts that may push them out of the neutral position.

The neutral position may correspond to an exact angular midpoint between the end positions of rotational movement permitted by the end stops, so that the torsion bar assembly may deflect by equal amounts each side of the neutral position before the end stops limit further movement.

The alignment parts may comprise three dimensional features that define the contact surfaces that are located such that an axial movement of the input shaft towards the output shaft, for instance during assembly prior to setting of the torsion bar, will generate a rotational force that moves the shafts towards the neutral position if offset from the neutral position. When in this neutral position the two shafts cannot be moved any further axially towards one another and in this position the alignment parts are configured so as to prevent any relative rotation of the input shaft relative to the output shaft when they are constrained against moving axially away from one another.

The first alignment part or the second alignment part may comprise a notch having opposed side walls that define contact surfaces and the other one of the first alignment part and the second alignment part may comprise a protrusion such as a rib that has opposed side walls that define contact surfaces. In use during assembly the protrusion enters the notch and self-centres as the input shaft and output shaft are pressed together along their common axis and the side walls strike one another and cooperate to perform the self-alignment function.

By self-centring at the neutral position we mean that the input shaft and output shaft may move rotationally angularly as they are pressed axially together if they are not initially in the ideal neutral position, movement stopping when they can no longer be pressed closer together and when the ideal neutral position is reached.

The notch may be provided on an outer circumferential face or an inner circumferential face of one of the input shaft and the output shaft, and the side walls may extend from the tip of the shaft away from the tip. The protrusion may be provided on an inner circumferential face of the other one of the input shaft and output shaft, extending from the tip of the shaft back along the shaft. Of course, the notch may instead be provided on an inner circumferential face and the protrusion on an outer circumferential face.

The notch may have opposed non-parallel planar side walls that form a V-shape, each side wall forming one contact surface of the first alignment part. Non-planar walls may be provided, for example with the side walls being curved to form a U-shape. Indeed, any shape is possible that can generate a reaction force that converts a part of the axial force used to move the two shafts together into a relative rotation movement of the shafts towards the neutral position if they are not in the correct neutral position.

All four of these opposed side walls will be brought together, as two pairs, at the same time when the shafts are pressed together in the neutral position, but only the pair on one side will be strike initially to create a rotational force that moves the shafts towards the neutral position.

There may be multiple first alignment parts that each engage a respective second alignment part.

For example, there may be more than one notch spaced around the end of the input shaft of the end of the output shaft and a corresponding protrusion that engages each notch.

The shape of the notch and the shape of the protrusion may be complimentary. Of course, they do not need to be complimentary shapes and a wide range of shapes are possible but in each case there must be at least one thrust surface of the first part that engages a thrust surface of the second part to cause relative angular movement of the input shaft and output shaft as they are pressed together to self-centre the two parts in the required neutral position.

The end stop faces may comprise faces of dog teeth formed on the input shaft and dog teeth formed on the output shaft. The dog teeth on one of the shafts may be provided on an external circumferential face, and on the other they may be provided on an internal circumferential face. The dog teeth on one shaft may define radially extending shoulders that engage corresponding radially extending shoulders of the dog teeth on the other shaft. To do this, the dog teeth must overlap axially.

In a most preferred arrangement, the dog teeth on the input shaft and the dog teeth on the output shaft may be defined as the side walls of a set of axially extending ribs spaced apart by notches. The circumferential width of each rib may be less than the circumferential width of the respective notch into which the rib is located, to allow the required angular deflection of the shafts, and in the neutral position the rib may be centrally positioned within the respective notch.

The first alignment feature may be located along at least one of the notches defined between dog teeth of one of the input shaft and the output shaft, and the second alignment feature may be located on the tip of at least one of the ribs defined by the dog teeth of the other one of the input shaft and the output shaft.

The location of the first alignment feature may be at the root of the notch, with the contact surfaces defined by inclined planar or non-planar wall portions that join the root to the side walls of the notch.

Preferably, where there are multiple dog teeth on each shaft, a first alignment feature or second alignment feature is provided for every dog tooth.

The axial length of the first and second alignment features may be less than the gap between the input shaft and output shaft to ensure they are held clear during normal use of the torsion bar assembly. The skilled person will appreciate that at the closest position axially between the input shaft and output shaft, defined as the position in which the overall axial length of the two shafts combined is the shortest possible without deforming either of the shafts, the features will create the correct rotational alignment, but will necessarily also prevent the required angular travel, so this axial separation becomes a key requirement after alignment in order that the shaft can fulfil its torsional deflection function for toque measurement.

The assembly may include a bearing race, plain bearing journal or bushing is located inside the output shaft that supports a portion of the torsion bar. This bearing may be located at the end of the output shaft closest to the input shaft.

The output shaft may be provided with an external shoulder that defines an abutment face that faces away from the input shaft. This face may correspond to the largest diameter of the output shaft over the whole length of the output shaft that extends from the shoulder to the end of the output shaft furthest from the input shaft. The shoulder may extend continuously around the circumference of the output shaft.

According to a second aspect, the invention provides a method of assembly of a torsion bar assembly of the first aspect comprising the following steps. The input shaft and output shaft are supported a distance apart on a common axis such that one of the shafts is prevented from rotating about that axis and the other is free to rotate. The input shaft is pressed towards the output shaft to bring the alignment parts into engagement thereby self-centering the shafts in the neutral position. Whilst the input shaft and output shaft are pressed together, the torsion bar is pressed into the output shaft from the end furthest from the input shaft until the splines on the torsion bar interfere with the corresponding splines on the input shaft and on the output shaft. During a final stage of assembly, the input shaft is caused to separate axially from the output shaft by a distance greater than the axial length of the alignment parts to permit free angular movement of the input shaft relative to the output shaft that is unimpeded by the alignment parts.

During the assembly method of the invention there is no requirement for any rotational holding of the torsion bar. The output shaft is clamped so it cannot rotate, and the input shaft is allowed to rotate freely relative to the output shaft to reach the correct final rotational alignment due to the alignment features. The engagement with the input shaft and output shaft prevents any relative rotational movement during insertion.

The method may comprise holding the input shaft axially using a spring force that is less than the insertion force of the torsion bar into the input output shaft so that on final insertion the spring force is overcome to automatically permit the required spacing between the input and output shaft to be created.

The method may comprise providing a hard stop that limits the amount of movement of the input shaft as the spring force is overcome so that once overcome to set the required spacing no further movement axially of the output shaft is permitted as the torsion bar is pressed into its final position.

The method may be carried out using an appropriate assembly tool.

Other advantages of this invention will become apparent to those skilled in the art from the following detailed description of the preferred embodiments, when read in light of the accompanying drawings.

BRIEF DESCRIPTION OF THE DRAWINGS

FIG. 1 is a view of an example of an output shaft prior to assembly into a torsion bar assembly of the present invention;

FIG. 2 is a view of an input shaft;

DETAILED DESCRIPTION OF THE INVENTION

Figure 3:
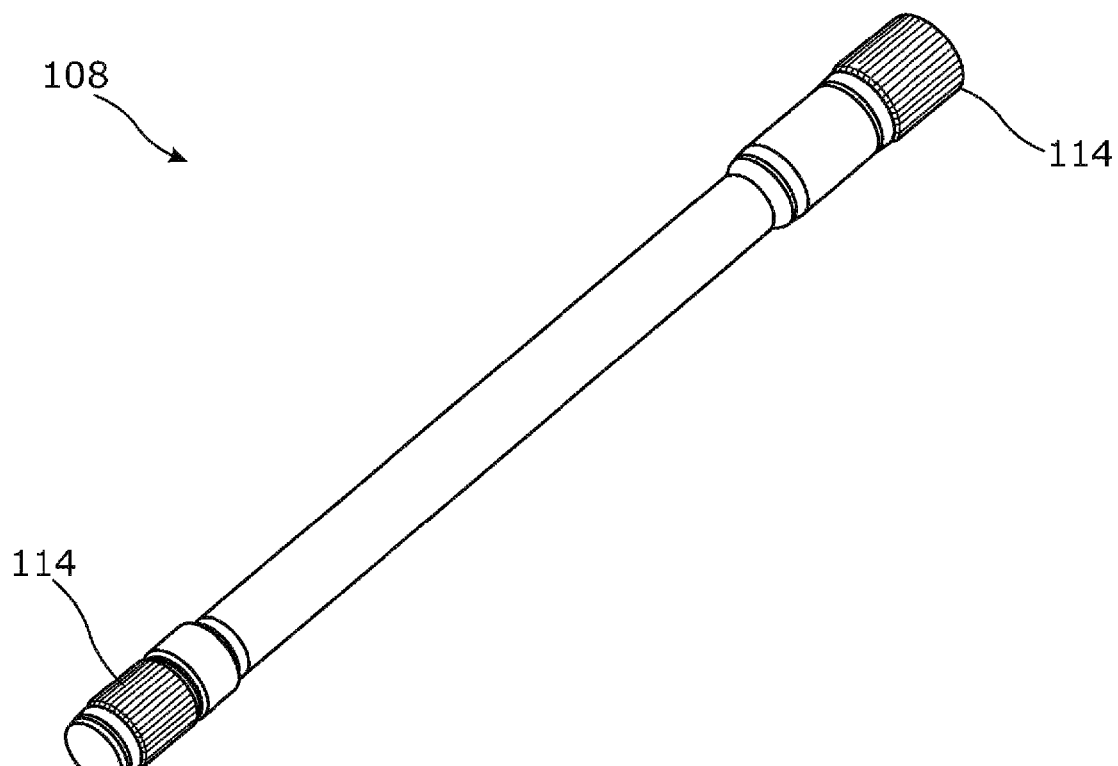
FIG. 3 is a view of a torsion bar.
Figure 4:
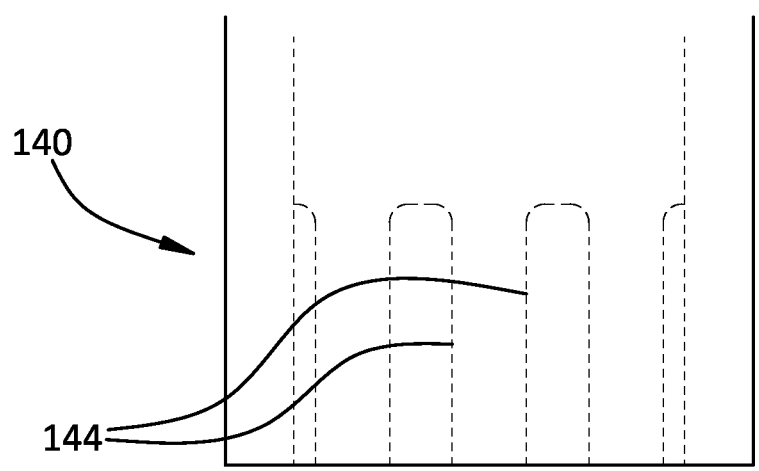
FIG. 4 is an enlarged view of an end portion of the output shaft showing the end stops and a second alignment part.
Figure 5:
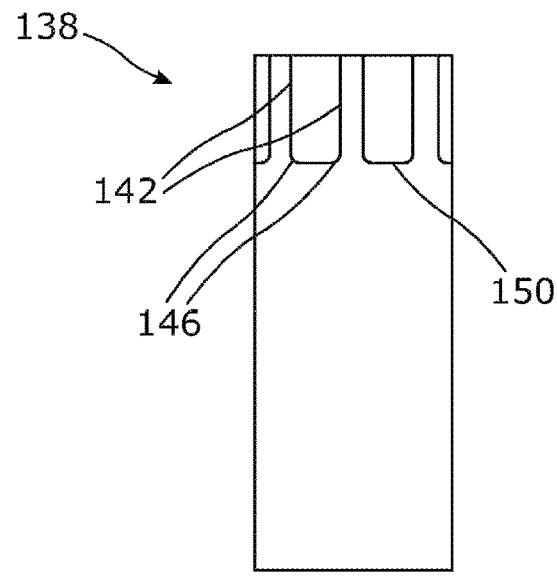
FIG. 5 is an enlarged view of an end portion of the input shaft showing the end stops and a first alignment part.
Figure 11:
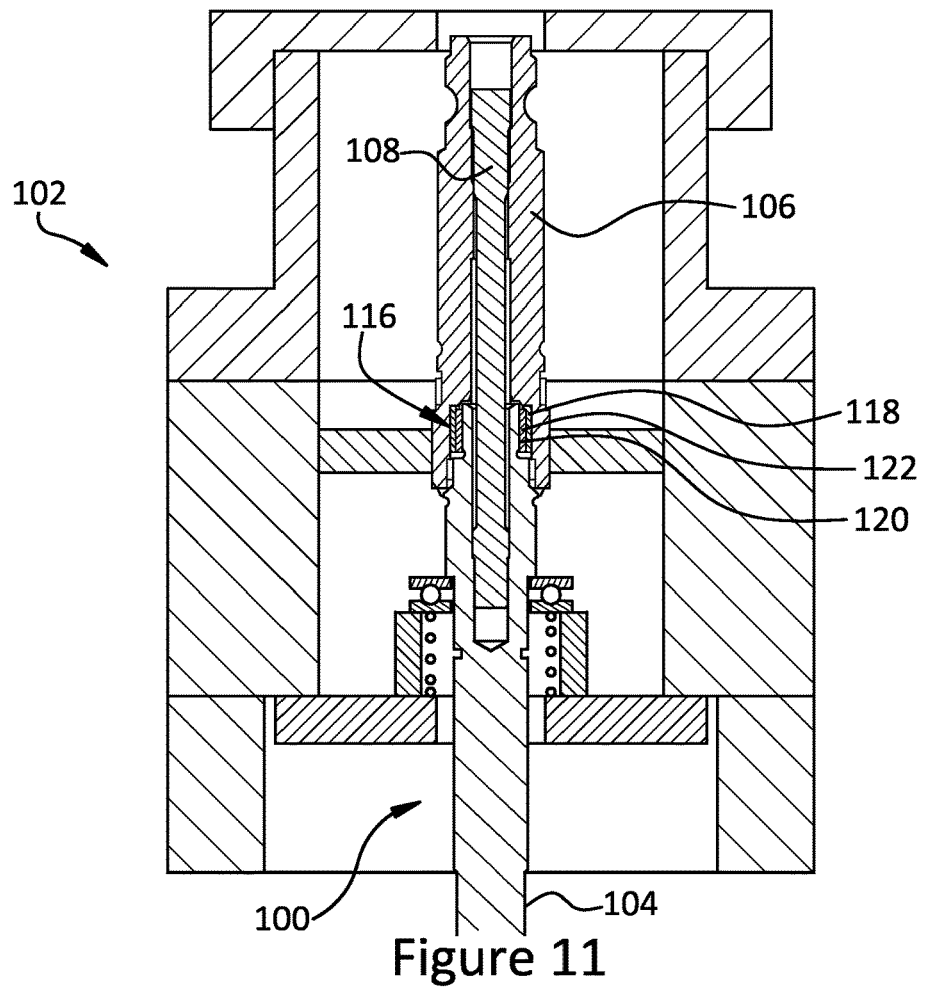

FIG. 11 shows an example of a complete torsion bar assembly 100 in accordance with an aspect of the invention. The torsion bar assembly 100 is shown in an assembly tool 102, which is not present after installation of the torsion bar assembly 100. The assembly 100 comprises an input shaft 104, shown in detail in FIG. 2, and an output shaft 106, shown in detail in FIG. 1, that are arranged in series along a common axis of rotation. The input shaft 104 and output shaft 106 are joined together by a torsion bar 108, which is shown in detail in FIG. 3. When a torsional load is applied to the input shaft 104, it is transferred to the output shaft 106 by the torsion bar 108. The torsion bar 108 is relatively flexible when subject to a torsional load, which causes an angular offset between the input shaft 104 and the output shaft 106 to be generated that is a function of the torque applied. The skilled person will appreciate that this angle can be measured using a suitable sensor or set of sensors and from this the torque carried by the shaft can be determined.

The output shaft 106 is hollow and has a bore 110 that extends from one end to the other, allowing the torsion bar 108 to be pressed into the output shaft 106 from one end until it protrudes out of the other end where it then extends into a hollow end 112 of the input shaft 104. The assembly process is explained in more detail below. The torsion bar 108 has splines 114 at each end. Those at the end furthest from the input shaft 104 are an interference fit with the plain diameter inside the output shaft 106. Those at the opposite end are an interference fit with the plain diameter inside the input shaft 104.

It is important to note that the torsion bar 108 is free to move rotationally relative to the output shaft 106 at all points along its length between the two sets of splines 114. However, to ensure the assembly 100 is relatively rigid with respect to bending forces, a bearing assembly 116 is provided which is fitted into the open end of the output shaft 106 adjacent to the input shaft 104. This comprises an outer bearing race 118 that is a snug fit into the end of the output shaft 106, an inner bearing race 120 that is on an outer circumferential surface of the input shaft 104, and a set of needle bearings 122 between the races 118, 120. A layer of grease is provided on the inner and outer races 120, 118 to help slide the bearing assembly 116 into place during production of the torsion bar assembly 100. Other bearing concepts such as a bushing or plain journal bearing may also be used within the scope of this invention.

As can be seen in the Figures, the end portion 124 of the output shaft 106 and the end portion 126 of the input shaft 104 are provided with end stops 128. These end stops 128 limit the angular movement of the input shaft 104 relative to the output shaft 106. In this case they limit the movement to approximately 5 degrees each side of the centre position, which is, in turn, defined as the relative angular position of the input shaft 104 and output shaft 106 when no torque is applied to the assembly 100, The end stops 128 could limit angular displacement over a smaller range, or a larger range in other embodiments within the scope of the present invention.

The end stops 128 in this example comprise dog teeth 130 that define shoulders that protrude radially outwards from the input shaft 104 and radially inwards from the output shaft 106, the shoulders are defined as the side walls of a set of slots or notches 132 cut into each of the shafts 104, 106. The regions between the notches 132 form circumferentially extending ribs 134. The ribs 134 on the output shaft 106 overlap axially with the notches 132 of the input shaft 104 so that all the ribs 134 are located within a respective notches 132. The circumferential width of each rib 134 is smaller than the circumferential width of the respective notches 132 in which it is located, allowing the required rotational movement of the shafts 104, 106 and in the neutral position the ribs 134 are located centrally within the notches 132 when viewed in cross-section.

Figure 16:
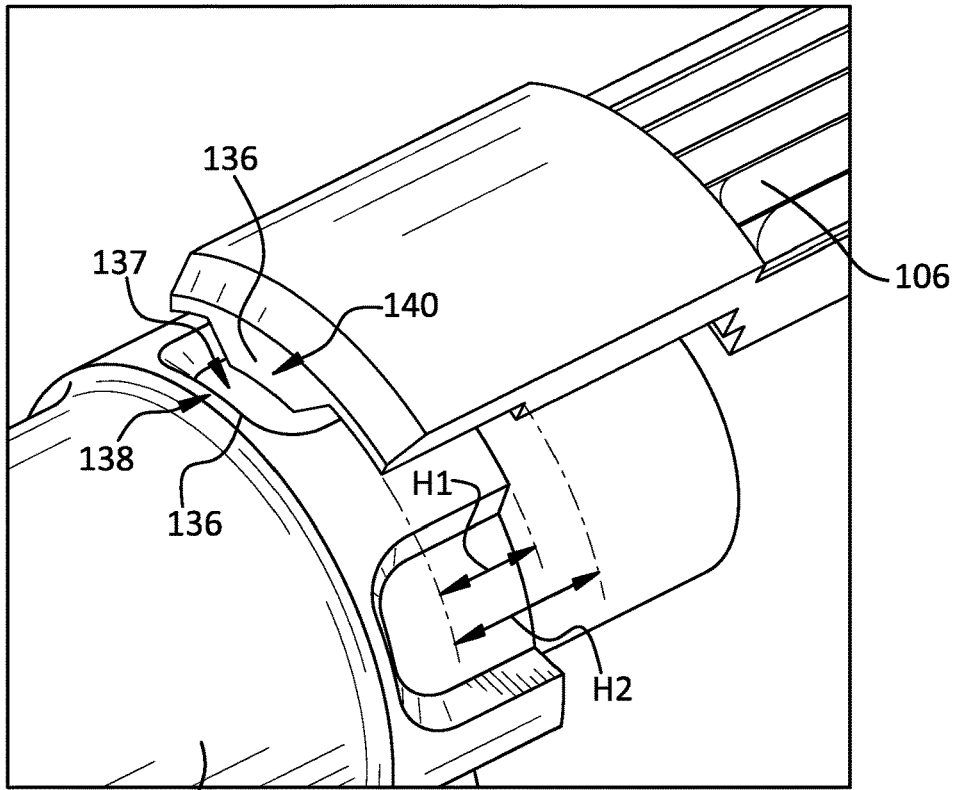

It is important that during normal use, with no overload torque, the input shaft 104 and output shaft 106 end faces 136 do not touch as they rotate relative to each other, to ensure that all torque is carried by the torsion bar 108 from the input shaft 104 to the output shaft 106 and not directly from the input shaft 104 to the output shaft 106. To ensure this is the case, the input shaft 104 and output shaft 106 are held apart axially by the torsion bar 108 to define a gap 137, which is shown in FIG. 16.

To achieve the correct neutral position, an alignment feature is provided comprising first and second alignment parts 138, 140. The first alignment parts 138 are provided on the input shaft 104 and the second alignment parts 140 are provided on the output shaft 106. These alignment parts 138, 140 co-operate when the output shaft 106 is pressed onto the input shaft 104 during manufacture before the torsion bar 108 is pressed position, securing the correct alignment at the neutral position. By co-operate we mean that they come into contact and slide over one another as required until they forcefully guide the shafts 104, 106 to the desired neutral alignment whereupon they hold the shafts 104, 106 in that position so long as an axial force is applied that urges the shafts 104, 106 axially towards one another.

The alignment features, when the output shaft 106 is pressed onto the input shaft 104, therefore not only align the two shafts 104, 106 correctly but also prevent accidental rotation that would knock the input shaft 104 and output shaft 106 out of alignment as the torsion bar 108 is pressed into place. If the two shafts 104, 106 are brought together exactly aligned with the neutral position, the opposing surfaces 142 of the first alignment parts 138 will both strike the corresponding opposing surfaces 144 of the second alignment part 140 at the same time and immediately prevent further axial movement. If there is misalignment, only the surfaces 142, 144 to that side of the neutral position will initially strike one another, creating a rotational force that pushes the shafts 104, 106 towards the neutral position. Further axial movement is then possible until the neutral position is reached.

FIGS. 12 to 16 show one example of a suitable set of alignment features, with the output shaft 106 shown in partial section, for clarity. As can be seen, the second alignment part 140 is defined by the terminal ends 148 of each rib 134 of the output shaft 106 and the first alignment part 138 is defined by curved connecting parts 146 that join the sides 142 of the notches 132 in the input shaft 104 with an end wall 150 of the notches 132. These two curved connecting parts 146 define thrust surfaces. The end walls 150 define the end faces 136 of the notches 132.

During assembly, the input and output shafts 104, 106 are pressed together with the ribs 134 on the output shaft 106 entering the notches 132 on the input shaft 104. The curved corners or connecting parts 146 at the root of the notches 132 in the input shaft 104 guide the tips of the ribs 134 of the output shaft 106 into position to ensure the correct alignment of the shafts 104, 106 in the neutral position where the ribs 134 are centrally located in the notches 132. The correct neutral position is secured when the input shaft 104 cannot be pushed any further towards the output shaft 106, the ribs 134 being wedged in place in the root of the notches 132. This guiding is facilitated by the contact faces—the opposing surfaces 142, 144—being inclined relative to the axis of the shafts 104, 106, converting the axial forces pressing the input shaft 104 and output shaft 106 together into a rotational force if they are not in the correct neutral position. When in the final neutral position, the contact faces produce equal and opposite rotational forces on the shafts 104, 106 to prevent them rotating out from the neutral position.

It is essential to the described embodiment that, on final setting of the assembly 100, the input shaft 104 and output shaft 106 are pulled apart slightly to allow the tips of the ribs 134 of the output shaft 106 to clear the curved surfaces—connecting parts 146—at the root of the notches 132 in the input shaft 104, as otherwise the torsion bar 108 will not be free to twist when a torque is applied. The two shafts 104, 106 are therefore pulled apart by a sufficient distance for the ribs 134 to clear the curved surfaces but ensuring there is no relative rotational movement of the shafts 104, 106 during this separation. The axial length H1 of the portion of the protrusion or rib 134 that engages into the notch 132 should also be less than the height H2 of the end stops 128 so that the separation does not prevent the end stops 128 from engaging when required.

To assemble the torsion bar assembly 100 of FIGS. 1 to 5, an assembly tool 102 may be provided of the kind shown during use in FIGS. 6 to 11. This comprises a base part 152 having a base plate 154 with a through-hole 156 into which the input shaft 104 may be inserted. A thrust bearing assembly 158 is provided which is held above the open top of the through-hole 156 by a compression spring 160. In use, this thrust bearing 158 will contact an external shoulder 162 provided on the input shaft 104 and offset from the end of the input shaft 104. This prevents the input shaft 104 dropping through the hole 156 in the base plate 152 whilst allowing the input shaft 104 to freely rotate around its long axis. The spring 160 transfers the weight of the input shaft 104 and any force acting upon the input shaft 104 onto the base plate 154.

The assembly tool 104 further includes an output shaft press part 164 that is located above the base plate 154 and the thrust bearing 158. This comprises a grip part 166 that grips securely to the outer face of an output shaft 106 when in use to prevent the outer face from rotating and prevents the output shaft 106 from moving axially. When gripped, the output shaft 106 is aligned axially with an input shaft 104 that is supported by the thrust bearing 158.

The assembly tool 102 also includes a mechanism (not shown) for moving the base plate 154 upwards towards the press part 164.

Lastly, the assembly tool 102 includes a secondary press part 170 for pressing a torsion bar 108 down through the output shaft 106 from the end furthest from the base part 152.

The operation of the assembly tool 102 is as follows:

Stage 1—A portion of the needle roller bearing 116 is greased on both sides and assembled into the output shaft 106.

Figure 6:
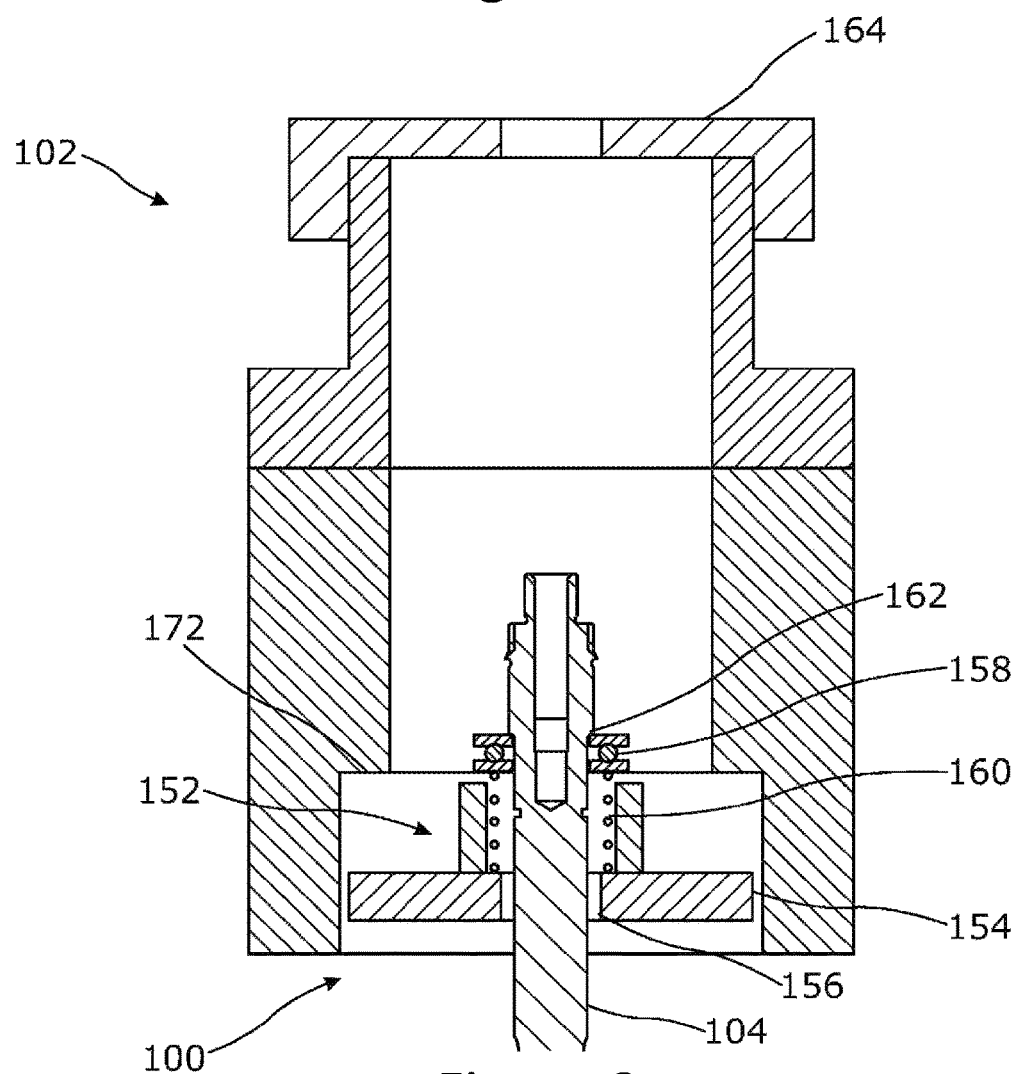
FIGS. 6 to 11 show the assembly of the torsion bar assembly from the parts shown in FIGS. 1 to 5 using a suitable assembly tool following steps in according with a second aspect of the invention.

Stage 2—The input shaft 104 is assembled into the press fixture so that that the external shoulder 162 abuts against the thrust bearing 158. This is shown in FIG. 6. The spring 160 and the thrust bearing 158 provide an axial load for centring the limit stops and achieving the final rotational position.

Figure 7:
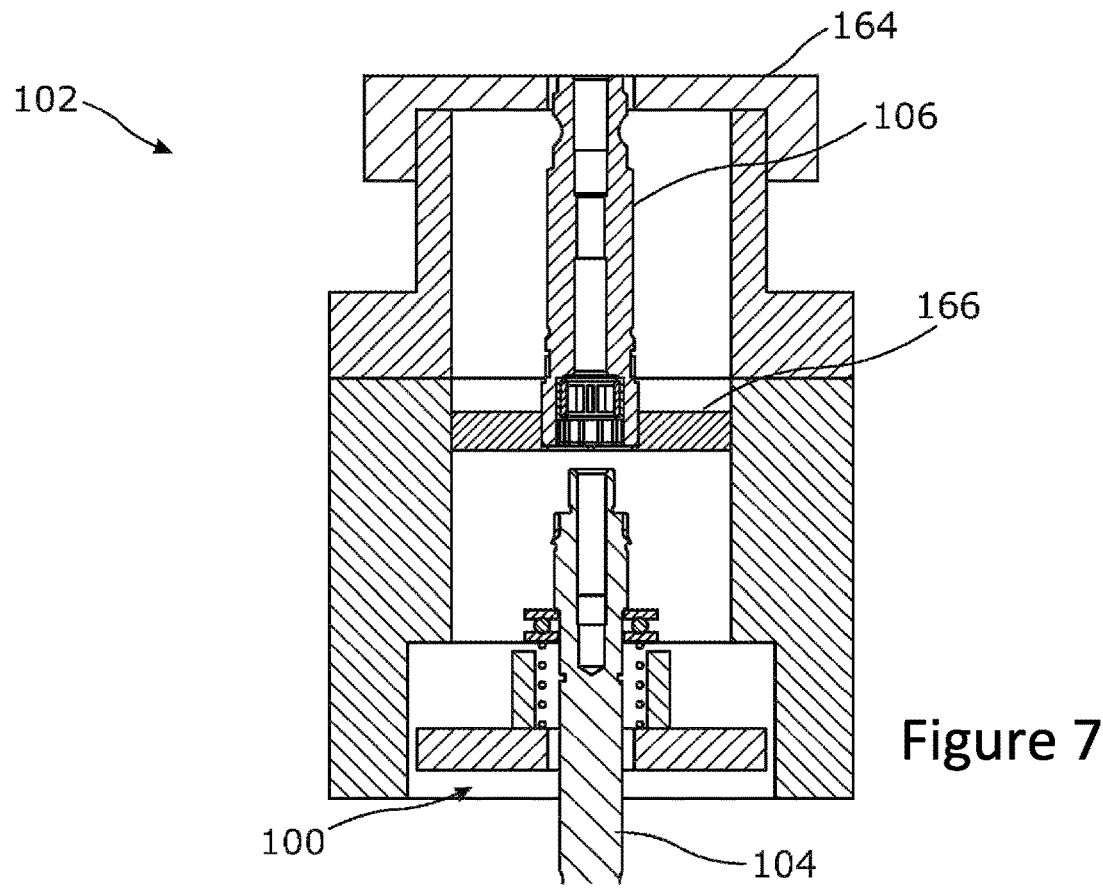

Stage 3—The output shaft 106 is assembled into the press fixture and is clamped in position so that the notch 132 in the end face of the input shaft 104 is approximately aligned with the protrusion of the output shaft 106. It does not matter if they are not at this stage precisely aligned. The output shaft 106 and input shaft 104 are offset along their shared axis. This is shown in FIG. 7.

Figure 8:
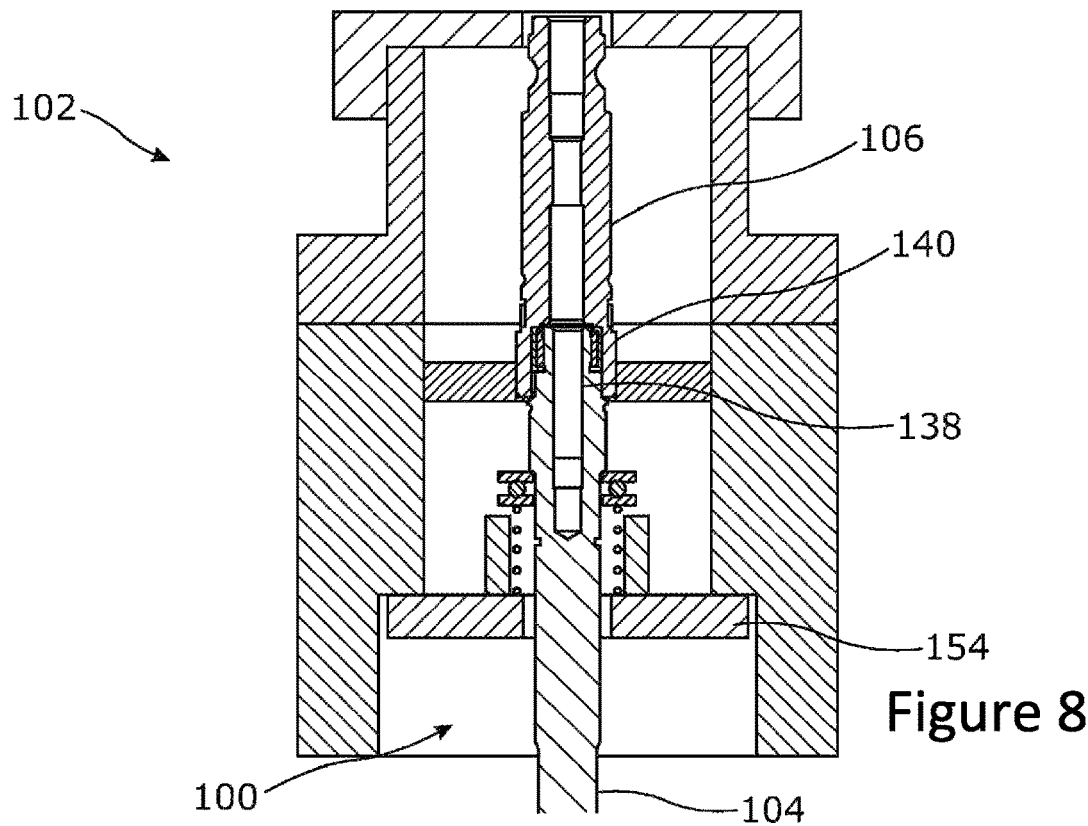
Figure 12:
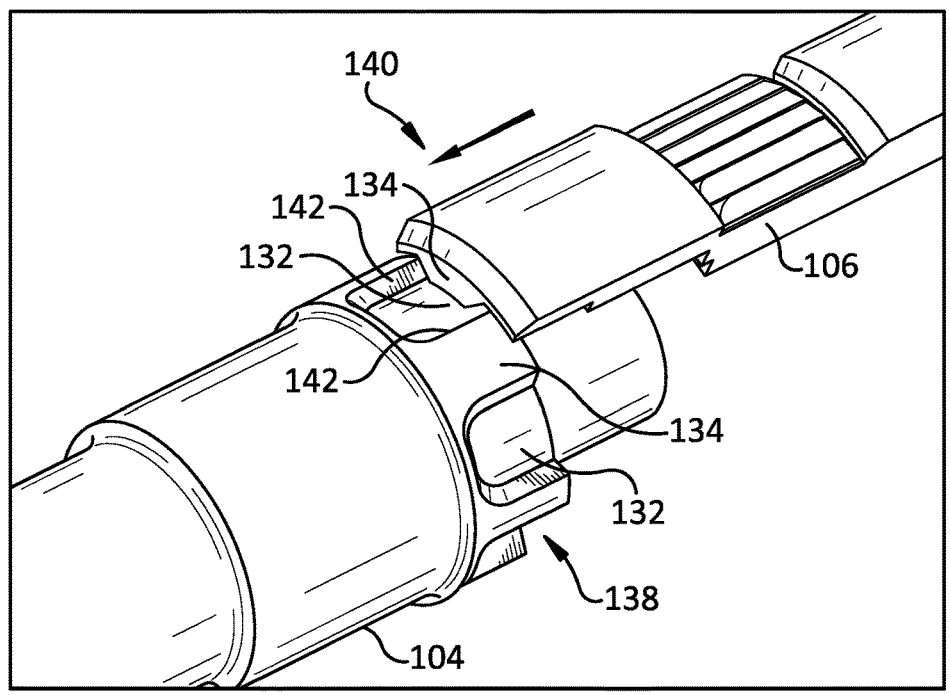
FIGS. 12 to 16 show the engagement of the alignment features during assembly of the torsion bar assembly and their final disengagement when the assembly is completed.
Figure 13:
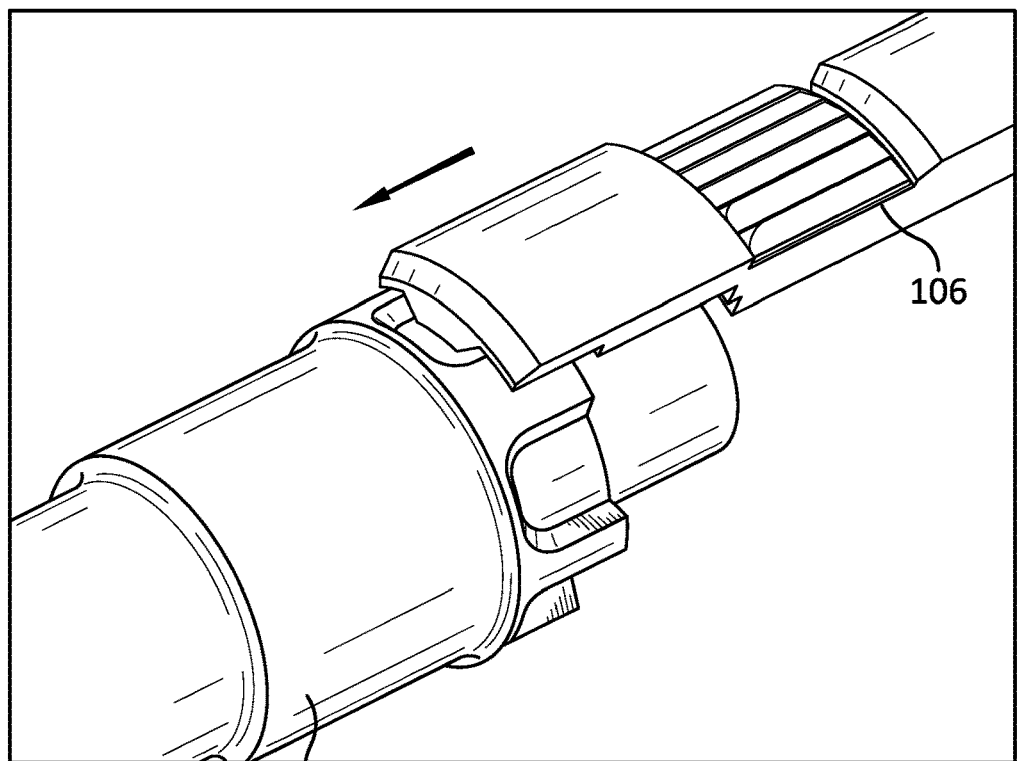
Figure 14:
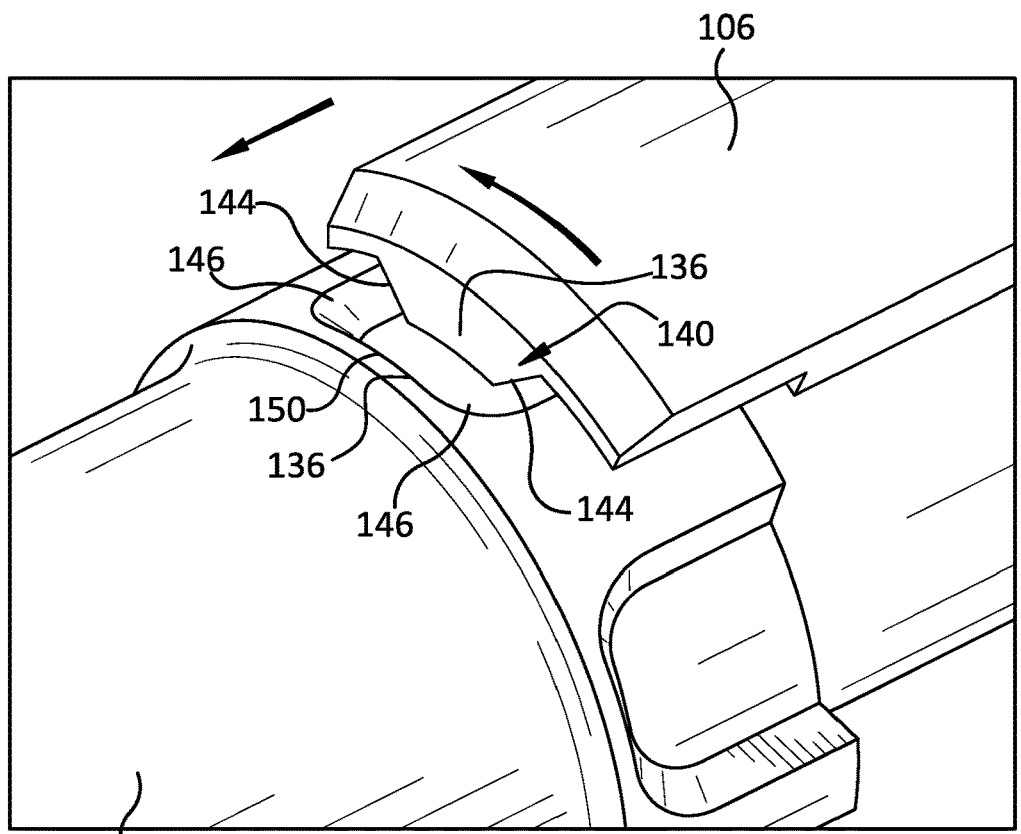
Figure 15:
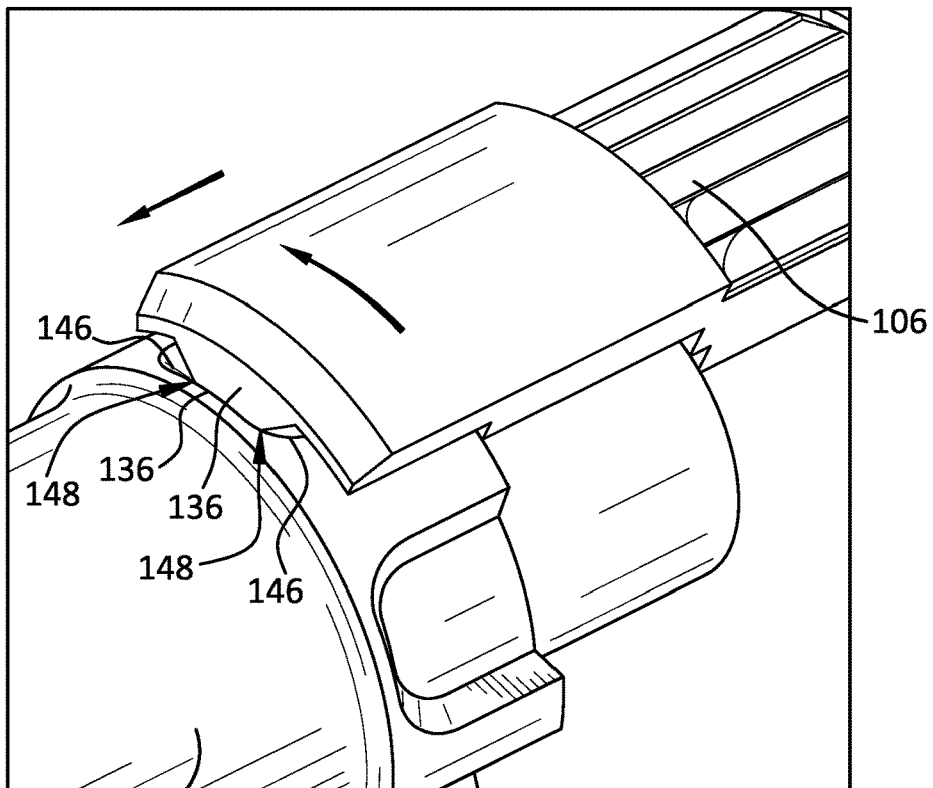

Stage 4—The base plate 154 is raised which, in turn, raises the input shaft 104 towards the fixed output shaft 106. This continues until the two shafts 104, 106 are sprung together, with the alignment parts 138, 140 in engagement. In this position, the input shaft 104 and output shaft 106 will have no spacing between them, which does not correspond to the required final axial position. However, this rotationally aligns the two shafts 104, 106 to each other by the means of the alignment features. Free rotational movement of the input shaft 104 is allowed by the thrust bearing 158 to enable the alignment features to guide the two shafts 104, 106 to the correct angular position. This is shown in FIG. 8. The movement of the first alignment part 138 into the second alignment part 140 to set the neutral position is shown in FIGS. 12 to 16. The arrows, in FIGS. 12 and 13, show that initially there is only axial movement but in the final stages, shown in FIGS. 14 and 15, the movement of input shaft. 104 relative to the fixed output shaft 106 is also rotational because they are initially introduced with a slight offset from the ideal neutral position. This rotation is generated due to the interaction of the thrust surfaces of the alignment parts 138, 140.

Figure 9:
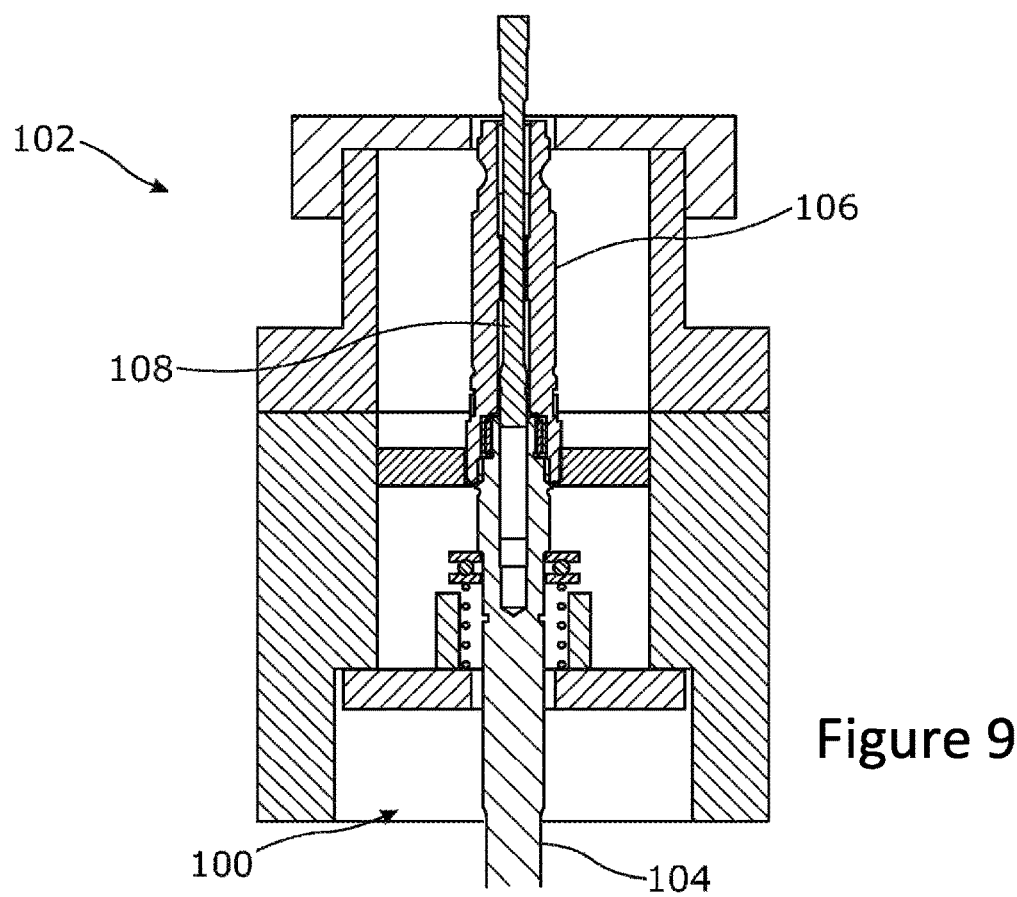

Stage 5—With the two shafts 104, 106 pressed together, the torsion bar 108 is assembled from one direction into the output shaft 106 and pressed down through the output shaft 106 by the second press part. There is no requirement for any rotational holding of the torsion bar 108. The input shaft 104 is kept correctly aligned with the output shaft 106 by the spring loading so it cannot rotate, and the input shaft 104 cannot rotate relative to the output shaft 106 due to the alignment features. This is shown in FIG. 9.

Figure 10:
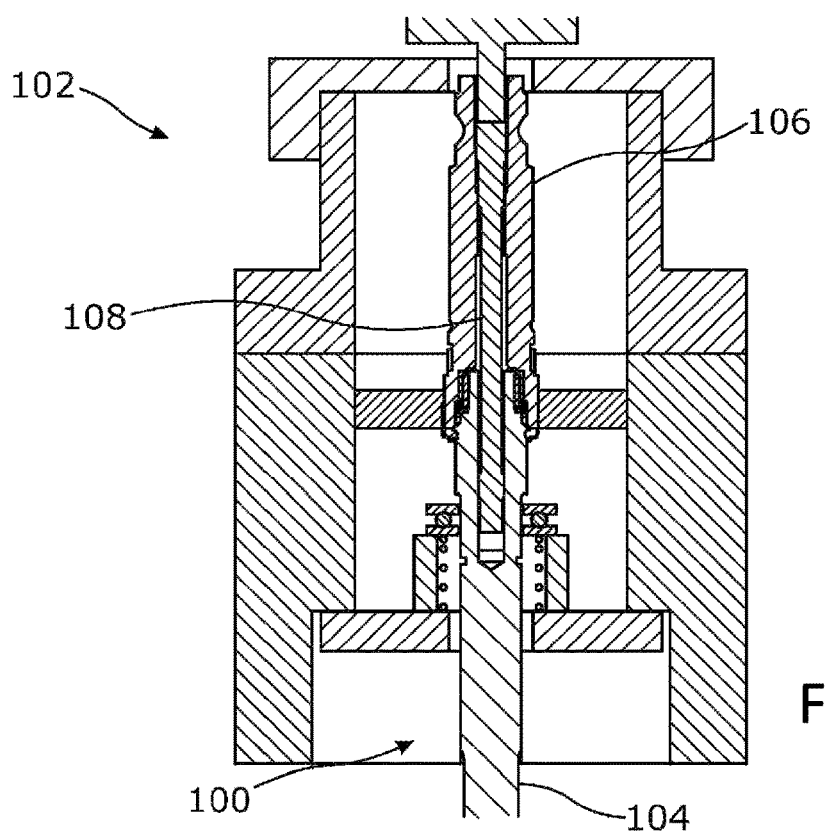

Stage 6—The torsion bar 108 is pressed further into the assembly 100. The torsion bar 108 will start to interfere with the inside diameters of the input shaft 104 and the output shaft 106. The output shaft 106 is rigidly clamped so cannot move axially. The input shaft 104, on the other hand is only held axially by the force of the spring 160. The reaction force generated at the torsion shaft 108 interferes with the input shaft 104 causing the spring plate 154 to move back, causing the input shaft 104 to separate from the output shaft 106. This continues until the back plate 154 strikes a hard stop 172. The position of this hard stop 172 is chosen to create the desired gap 137 between the shafts 104, 106. This reaction force will also stop any rotational movement between the input and output shafts 104, 106 during the process. This is shown in FIG. 10.

Stage 7—The second press is then released and the clamp of the output shaft 106 is released so that the finished assembly 100 may then be removed from the assembly tool 102. In this position, the first alignment part 138 is held clear of the second alignment part 140.

In accordance with the provisions of the patent statutes, the principle and mode of operation of this invention have been explained and illustrated in its preferred embodiments. However, it must be understood that this invention may be practiced otherwise than as specifically explained.

What is claimed is:

1. A torsion bar assembly comprising:
an input shaft;
an output shaft;
a torsion bar that connects the input shaft to the output shaft and fixes a relative angular position of the input shaft and output shaft at a neutral position when no torque is carried by the torsion bar;
at least one protrusion on an inner circumferential face of one of the input shaft and the output shaft, and at least one notch on an outer circumferential face of the other of the input shaft and the output shaft, a portion of the at least one protrusion being received in the at least one notch, the at least one protrusion having first and second side walls and an axial end face, the at least one notch having first and second side walls and an axial end face, the first side wall of the at least one protrusion being configured to engage the first side wall of the at least one notch to limit an angular deflection of the torsion bar assembly in a first direction away from the neutral position, the second side wall of the at least one protrusion being configured to engage the second side wall of the at least one notch to limit an angular deflection of the torsion bar assembly in a second direction that opposes the first direction;
wherein the neutral position of the torsion bar assembly is a position in which the at least one protrusion is centrally located in the at least one notch;
wherein the axial end face of the at least one protrusion faces the axial end face of the at least one notch across a gap so that the axial end face of the at least one protrusion does not contact the axial end face of the at least one notch over a range of angular movement of the torsion bar, the first and second side walls of each of the at least one projection and the at least one notch configured such that if the input shaft and the output shaft are pressed axially towards each other to close up the gap during assembly of the torsion bar assembly, the first side walls of the at least one protrusion and the at least one notch and/or the second side walls of the at least one protrusion and the at least one notch co-operate to set the relative angular position of the input shaft and the output shaft to the neutral position.

2. The torsion bar assembly according to claim 1 in which the side walls of the at least one notch extend from a tip of the shaft on which the at least one notch is provided away from the tip of the shaft on which the at least one notch is provided, the at least one protrusion extending from a tip of the shaft on which the at least one protrusion is provided away from the tip of the shaft on which the at least one protrusion is provided.

3. The torsion bar assembly according to claim 1 in which the first and second side walls of the at least one notch are inclined relative to a longitudinal axis of the shaft on which the at least one notch is provided, the first and second side walls of the at least one protrusion being inclined relative to a longitudinal axis of the shaft on which the at least one protrusion is provided.

4. The torsion bar assembly according to claim 3 in which when the inclined first side walls of the at least one protrusion and the at least one notch engage one another as the input shaft and the output shaft are pressed axially towards each other to close up the gap, the inclination of the first side walls of the at least one protrusion and the at least one notch convert axial pressing forces into a rotational force that causes the input shaft and the output shaft to move to the neutral position.

5. The torsion bar assembly according to claim 3 in which when the inclined second side walls of the at least one protrusion and the at least one notch engage one another as the input shaft and the output shaft are pressed axially towards each other to close up the gap, the inclination of the second side walls of the at least one protrusion and the at least one notch convert axial pressing forces into a rotational force that causes the input shaft and the output shaft to move to the neutral position.

6. The torsion bar assembly according to claim 1 in which an axial length of the portion of the at least one protrusion that is received in the notch being less than a total axial height of the at least one protrusion to ensure the first and second alignment features are held clear during normal use of the torsion bar assembly.

7. The torsion bar assembly according to claim 1 in which the gap extends axially between the input and output shafts and separates the input shaft from the output shaft.

8. The torsion bar assembly according to claim 1 in which the at least one protrusion has first and second terminal ends adjacent the axial end face of the at least one protrusion, the at least one notch having first and second curved corners adjacent the axial end face of the at least one notch, the first and second curved corners guiding the first and second terminal ends into a position in which the input and output shafts are in the neutral position when the input shaft and the output shaft are pressed axially towards each other during assembly of the torsion bar assembly.

9. The torsion bar assembly according to claim 8 in which the first curved corner joins the first side wall of the at least one notch to the axial end face of the at least one notch, the second curved corner joining the second side wall of the at least one notch to the axial end face of the at least one notch.

10. A method of assembling the torsion bar assembly according to claim 8, the method comprising:
- supporting the input shaft and the output shaft a distance apart on a common axis such that one of the input and output shafts is prevented from rotating about that axis and other one of the input and output shafts is free to rotate;
- pressing the input shaft towards the output shaft to bring the first and second curved corners into engagement with the first and second terminal ends thereby self-centring the input and output shafts in the neutral position;
- whilst the input shaft and output shaft are pressed together, pressing the torsion bar into the output shaft from an end furthest from the input shaft until splines on the torsion bar interfere with corresponding splines on the input shaft and on the output shaft; and
- during a final stage of assembly, causing the input shaft to separate axially from the output shaft to form the gap and thereby permit free angular movement of the input shaft relative to the output shaft that is unimpeded by the first and second curved corners and the first and second terminal ends.

11. A torsion bar assembly comprising:
- an input shaft;
- an output shaft;
- a torsion bar that connects the input shaft to the output shaft and fixes a relative angular position of the input shaft and output shaft at a neutral position when no torque is carried by the torsion bar;
- at least one protrusion on an inner circumferential face of one of the input shaft and the output shaft, and at least one notch on an outer circumferential face of the other of the input shaft and the output shaft, a portion of the at least one protrusion being received in the at least one notch, the at least one protrusion having an axial end face and first and second terminal ends adjacent the axial end face, the at least one notch having an axial end face and first and second curved corners adjacent the axial end face of the at least one notch;
- wherein the neutral position of the torsion bar assembly is a position in which the at least one protrusion is centrally located in the at least one notch;
- wherein the axial end face of the at least one protrusion faces the axial end face of the at least one notch across a gap so that the axial end face of the at least one protrusion does not contact the axial end face of the at least one notch over a range of angular movement of the torsion bar, and when the input shaft and the output shaft are pressed axially towards each other to close up the gap during assembly of the torsion bar assembly, the first and second curved corners guide the first and second terminal ends into a position that corresponds to the neutral position of the input and output shafts and prevent relative angular movement between the input shaft and the output shaft once the input and output shafts are in the neutral position.

12. The torsion bar assembly according to claim 11 in which the at least one protrusion has first and second side walls extending axially from the axial end face of the at least one protrusion, the at least one notch having first and second side walls extending axially from the axial end face of the at least one notch, the first side wall of the at least one protrusion being configured to engage the first side wall of the at least one notch to limit an angular deflection of the torsion bar assembly in a first direction away from the neutral position, the second side wall of the at least one protrusion being configured to engage the second side wall of the at least one notch to limit an angular deflection of the torsion bar assembly in a second direction that opposes the first direction.

13. The torsion bar assembly according to claim 12 in which the first curved corner joins the first side wall of the at least one notch to the axial end face of the at least one notch, the second curved corner joining the second side wall of the at least one notch to the axial end face of the at least one notch.

14. The torsion bar assembly according to claim 12 in which the first and second side walls of the at least one notch are inclined relative to a longitudinal axis of the shaft on which the at least one notch is provided, the first and second side walls of the at least one protrusion being inclined relative to a longitudinal axis of the shaft on which the at least one protrusion is provided.

15. A method of assembling the torsion bar assembly according to claim 11, the method comprising:
- supporting the input shaft and the output shaft a distance apart on a common axis such that one of the input and output shafts is prevented from rotating about that axis and other one of the input and output shafts is free to rotate;
- pressing the input shaft towards the output shaft to bring the first and second curved corners into engagement with the first and second terminal ends thereby self-centering the input and output shafts in the neutral position;
- whilst the input shaft and output shaft are pressed together, pressing the torsion bar into the output shaft from an end furthest from the input shaft until splines on the torsion bar interfere with corresponding splines on the input shaft and on the output shaft; and
- during a final stage of assembly, causing the input shaft to separate axially from the output shaft to form the gap and thereby permit free angular movement of the input shaft relative to the output shaft that is unimpeded by the first and second curved corners and the first and second terminal ends.

* * * * *